(12) United States Patent
Wang et al.

(10) Patent No.: US 11,806,674 B1
(45) Date of Patent: Nov. 7, 2023

(54) POLYACRYLONITRILE-BASED MEMBRANE FOR URANIUM-EXTRACTION-FROM-SEAWATER-SEAWATER DESALINATION COGENERATION AND ITS PREPARATION METHOD THEREOF

(71) Applicant: Harbin Engineering University, Harbin (CN)

(72) Inventors: Jun Wang, Harbin (CN); Jiaqi Yu, Harbin (CN); Qi Liu, Harbin (CN); Hongsen Zhang, Harbin (CN); Jingyuan Liu, Harbin (CN); Rongrong Chen, Harbin (CN); Jing Yu, Harbin (CN); Jiahui Zhu, Harbin (CN); Rumin Li, Harbin (CN); Peili Liu, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 18/124,024

(22) Filed: Mar. 21, 2023

(30) Foreign Application Priority Data

Apr. 21, 2022 (CN) .......................... 202210422541.8

(51) Int. Cl.
*B01D 67/00* (2006.01)
*B01D 69/02* (2006.01)
*B01D 71/42* (2006.01)
*C22B 60/02* (2006.01)

(52) U.S. Cl.
CPC ......... *B01D 67/0079* (2013.01); *B01D 69/02* (2013.01); *B01D 71/42* (2013.01); *B01D 2323/02* (2013.01); *B01D 2325/36* (2013.01); *C22B 60/0265* (2013.01)

(58) Field of Classification Search
CPC ..... B01D 67/0079; B01D 69/02; B01D 71/42
See application file for complete search history.

(56) References Cited

U.S. PATENT DOCUMENTS

2021/0162371 A1* 6/2021 Ma .......................... G21F 9/12

FOREIGN PATENT DOCUMENTS

CN 108794661 A * 11/2018 ............ B01J 20/261

OTHER PUBLICATIONS

Geng X—CN-108794661-A machine translation—Nov. 2018 (Year: 2018).*

* cited by examiner

*Primary Examiner* — Bradley R Spies
(74) *Attorney, Agent, or Firm* — Bayramoglu Law Offices LLC

(57) ABSTRACT

A high flux antibacterial polyacrylonitrile-based uranium-extraction-from-seawater-seawater desalination cogeneration membrane and a preparation method thereof are disclosed. To satisfy demand of uranium-extraction-from-seawater-seawater desalination cogeneration application, polyacrylonitrile, chitosan and amidoxime modified polyacrylonitrile are taken as raw materials and a proportion of raw materials of a casting membrane are optimized in a membrane forming process. The conversion rate of polyacrylonitrile is adjusted so that formation of an amidoxime modified polyacrylonitrile powder in a casting membrane liquid mixing system is regulated and controlled, thereby significantly improving the mechanical properties, the flux, the hydrophilicity, the antibacterial property and the uranium adsorptive property. A compound cogeneration membrane composed of a top membrane, a clipping membrane and a bottom membrane are also prepared according to actual function characteristics of seawater and the membrane material, and the uranium-extraction-from-seawater-seawater desalination performance of the membrane material is integrally improved.

8 Claims, 9 Drawing Sheets

POLYACRYLONITRILE-BASED MEMBRANE FOR URANIUM-EXTRACTION-FROM-SEAWATER-SEAWATER DESALINATION COGENERATION AND ITS PREPARATION METHOD THEREOF

CROSS REFERENCE TO THE RELATED APPLICATIONS

This application is based upon and claims priority to Chinese Application No. 202210422541.8, filed Apr. 21, 2022, the entire contents of which are incorporated herein by reference.

TECHNICAL FIELD

The present invention relates to the technical field of functional membrane materials and preparation methods therefor, and particularly relates to a high flux antibacterial polyacrylonitrile-based uranium-extraction-from-seawater-seawater desalination cogeneration membrane and a preparation method therefor.

BACKGROUND

Due to scarcity of uranium resources in lands of China and abundant uranium reserves in seawater, uranium extraction from seawater is regarded as an important way to realize sustainable supply of nuclear fuels and satisfy the demand on carbon neutrality. However, low adsorption rate, difficulty to process and form adsorption materials and high extraction cost have become a bottleneck problem in industrialization development of uranium extraction from seawater. A uranium-extraction-from-seawater-seawater desalination cogeneration mode can effectively sole the above problem. A uranium-extraction-from-seawater material is prepared into a pre-treatment membrane for seawater desalination, and the contact probability of the adsorption material and uranium is improved by means of a seawater desalination power system, so that the adsorption rate is increased. Meanwhile, uranium-extraction-from-seawater-seawater desalination cogeneration can significantly lower the uranium-extraction-from-sea water and sea water desalination costs.

In a membrane material, polyacrylonitrile featuring good chemical stability, thermal stability, low cost and the like raises considerable concern. However, as the membrane material for uranium-extraction-from-seawater-seawater desalination cogeneration (hereinafter referred to as a cogeneration membrane), polyacrylonitrile has the following problems:

Problem 1: the flux of the polyacrylonitrile membrane is low. Compared with other adsorption materials, the cogeneration membrane not only requires excellent uranium adsorption performance, but also has to satisfy flow requirement during seawater desalination. Therefore, the membrane material shall feature high flux. In addition, the high flux can significantly lower the power cost and reduce the energy consumption. However, owing to the structural characteristics of polyacrylonitrile, its flux performance is hard to satisfy the cogeneration requirement.

Problem 2: biofouling on the surface of the polyacrylonitrile membrane is severe. The polyacrylonitrile material itself does not have the antifouling function. Bacteria and microorganisms in seawater will be attached to the surface of the membrane and are further bred to form a fouled membrane, so that membrane pores are plugged, which will prevent uranium from being effectively bonded with adsorption sites on the membrane so as to affect the adsorption performance severely. The membrane pores are plugged, so that the membrane flux declines dramatically, and its cogeneration application function of the membrane is lost.

Problem 3: uranium adsorption capacity of polyacrylonitrile is poor. Functional groups in polyacrylonitrile do not possess the selective adsorption capacity. There are various competitive ions coexisting in oceans, and it is hard for polyacrylonitrile to adsorb uranium selectively. Secondly, the polyacrylonitrile material itself is short of coordination interaction mechanism through which the polyacrylonitrile material is stably bonded with uranium ions. In the cogeneration process, under a high seawater flow condition, the uranium ions adsorbed to the material featuring poor stability are likely to lose. Therefore, when polyacrylonitrile is used as the cogeneration membrane, it has to modify polyacrylonitrile so as to comprehensively improve the adsorption performance.

Problem 4: the polyacrylonitrile membrane features poor hydrophilicity. During uranium extraction from seawater, only fully contacting the membrane, can the uranium ions in seawater be adsorbed well. Therefore, good hydrophilicity is the premise to guarantee good adsorption performance. Polyacrylonitrile features poor hydrophilicity, directly resulting in poor uranium adsorption performance.

The Above Problems Affect and Restrain One Another, which Severely Obstructs the Uranium-Extraction-from-Seawater-Seawater Desalination Cogeneration Progress and has to be Solved Comprehensively and Systematically:

Influence of other factors on flux: fouling organisms will form a biofouling membrane on the surface of the material, and bacteria and microorganisms grow and are bred in pore canals, which severely reduces the membrane flux, thereby directly causing that the membrane flux cannot satisfy the requirement on flow of the cogeneration membrane during seawater desalination. The membrane material features poor hydrophilicity, which directly causes increased resistance and declined flux when seawater passes through the cogeneration membrane. In the cogeneration process, the flux is not the pure seawater volume flux but the quantity of seawater when uranium can be effectively extracted. Therefore, the adsorption performance which is not high will result in declined "effective flux" of seawater.

Influence of other factors on adsorption performance: the membrane material has to possess excellent hydrophilicity to enable the uranium ions in seawater to fully contact the membrane, so that the adsorption performance can be effectively improved. Biofouling obstructs effective contact between the uranium ions and the membrane material, which directly causes that the uranium ions cannot be adsorbed and enriched. The concentration of the uranium ions in seawater is low and is usually 3 ppb, and the total quantity of the uranium ions passing through the membrane material can only be increased by high flux. Factors such as "Effective flux", seawater passing mode and shear stress during passing have an important influence on the adsorption performance.

To Comprehensively Solve the Above Problems, there are Following Technical Difficulties in the Prior Art:

Technical difficulty 1: the surface of the polyacrylonitrile material is modified in the prior art, which results in significant reduction of the flux of the material.

Compared with other adsorption materials, besides excellent uranium adsorption performance, the cogeneration membrane further has to possess high flux performance. Existing studies mainly focus on surface modification of the polyacrylonitrile membrane, where corresponding functional groups are introduced to improve the uranium adsorption capacity and the hydrophilicity. Although related performance is improved to a certain extent by means of surface modification, in the modification process, original pore structures of the membrane are damaged, membrane pores shrink, and the membrane flux declines dramatically, so that the surface modified polyacrylonitrile membrane cannot be used as the cogeneration membrane. Preliminary studies show that after surface amidoximated modification of the polyacrylonitrile membrane, compared with an unmodified polyacrylonitrile membrane, the membrane pores shrink, as shown in FIGS. 1A and B, and the membrane flux declines, as shown in FIG. 2.

Technical difficulty 2: it is hard to fully ix polyacrylonitrile and a modifying material together when they are blended, which cannot satisfy the related requirements of cogeneration.

Compared with a common composite membrane material, there is a higher requirement on compatibility among compositions of the cogeneration membrane material. In existing studies, corresponding performance of the membrane is improved by blending polyacrylonitrile with other hydrophilic modifying materials or antibacterial modifying materials. However, due to a relatively large difference between polyacrylonitrile and the modifying materials in polarity, it is difficult to fully mix polyacrylonitrile and the modifying materials together, so that it is difficult to prepare the cogeneration membrane material featuring uniform composition and good forming effect by means of phase inversion. Even if the membrane is formed, as polyacrylonitrile and the modifying materials are non-uniformly mixed, it is likely to generate flaws when the membrane is prepared by means of phase inversion, which causes that the mechanical properties and stability of the material are difficult to satisfy the requirements of the cogeneration membrane. Preliminary studies show that during blending modification of the membrane by adding chitosan into polyacrylonitrile, although the membrane can be formed by adjusting experiment parameters and the formula of the casting solution, compositions of the membrane are non-uniform, and a part of modifying materials are not fully dissolved in the membrane in granular form, which severely affects the actual application of the cogeneration membrane, as shown in FIG. 1C. The membrane shown in FIG. 1C contains many undissolved chitosan particles, which significantly weakens the mechanical properties of the membrane and shortens the service life of the membrane, thereby being difficult to achieve the cogeneration requirement. Therefore, in a case where the blending modification mode is used for preparing the cogeneration membrane, it has to adjust the membrane pore structure.

Technical difficulty 3: it is difficult to synchronously improve the flux and the adsorption performance by means of existing flux increasing technologies.

First of all, in the membrane forming process, the organic macromolecular additive is added, pore canals (shown in FIG. 1A) consistent with the water flow direction will be formed in the polyacrylonitrile membrane, and these canals can effectively improve the membrane flux. But the probability that the uranium ions are adsorbed to the membrane material is reduced, and meanwhile, the directional flow direction of seawater is perpendicular to the surface of the membrane material, and the seawater will generate a shear action on the surfaces of the canals. "Scouring" to the adsorption membrane caused by the shear action will greatly reduce the adsorption performance.

Secondly, the quantity of seawater passing through the membrane can be increased by increasing the pressure. However, this kind of pressure will further improve the "scouring" effect and reduce the adsorption performance. Therefore, under the existing technical condition of increasing the flux, when uranium passes through the membrane, most uranium flows out directly through the pore canals and cannot be bonded with the adsorption sites in the membrane, so that the utilization rate of the adsorption sites is insufficient. Although a small part of uranium is adsorbed to the surface of the membrane, as a result of large flow of the seawater desalination process, uranium adsorbed to the surface of the membrane is unstable and is likely to flow out directly along with the water flow, which severely affects the adsorption performance of the membrane.

Technical difficulty 4: the above problems are solved comprehensively and systematically, and the membrane meets the requirement of the uranium-extraction-from-seawater-seawater desalination cogeneration process. When the membrane is subjected to blending modification, it needs to add various modifying materials. However, the more the added compositions are, the larger the difficulty to solve the compatibility among the materials is.

In the preparation process of the polyacrylonitrile membrane, the hydrophilic material, the antibacterial material and the material with high uranium adsorption performance can be added to improve the performance of the membrane. However, the precondition to prepare the blend membrane by means of phase inversion is that the casting membrane solution is uniform and stable but is not layered. Neither can all the modifying materials and polyacrylonitrile be dissolved in the solvent nor are all the modifying materials added to enable the prepared membrane to satisfy the technological requirements of uranium-extraction-from-seawater-seawater desalination cogeneration. Preliminary studies show that the more the types of the modifying materials added into polyacrylonitrile are, the larger the membrane forming difficulty is.

SUMMARY

Aiming at the above technical problems and the technical difficulties thereof, technical conceptions are provided as follows:

Aiming at the technical difficulty 1: the present invention does not adopt a technical route of forming the membrane and modifying the membrane successively, but add the modifying materials in the process of preparing the casting membrane solution, which avoids the problems of membrane pore plugging and significant decline of the membrane flux caused by surface modification of the membrane. In the process of preparing the casting membrane solution, the modifying materials such as hydrophilic materials, antibacterial materials and adsorption active sites are added, so that the adsorption performance, the antibacterial performance and the flux performance of the membrane material are improved integrally rather than pure modification of the surface of the material.

Aiming at the technical difficulty 2: in the present invention, the amidoxime modified polyacrylonitrile powder is prepared firstly, and the modified part can be bonded with chitosan by way of interaction such as hydrogen bonds by introducing oximido and amido, so that the modified part is well compatible with chitosan. Nitrile groups in polyacrylonitrile are reserved in the unmodified part, so that the unmodified part is well compatible with polyacrylonitrile. The amidoxime modified polyacrylonitrile powder plays a role of a linker in the mixed system of polyacrylonitrile and chitosan, so that the prepared cogeneration membrane is uniform, stable and good in forming effect. Experimental results show that chitosan is fully dispersed in a polyacrylonitrile matrix, so that the uniformity, the antibacterial performance and the mechanical properties of the material are significantly improved.

Aiming at the technical difficulty 3: the amidoxime modified polyacrylonitrile powder in the present invention is well compatible with chitosan and polyacrylonitrile. The organic macromolecules in the original process in the system still have the hole making function for polyacrylonitrile. However, as original uniform compositions have been changed, the pore canal structures identical to the directional flow direction of seawater in the unmodified polyacrylonitrile cannot be formed. Moreover, the pore canals with different sizes and structures formed after modification can increase the contact area between the uranium ions and the membrane and reduce the shear action to the surface of the adsorption material when the seawater passes through, which contributes to improving the uranium adsorption performance of the cogeneration membrane.

Meanwhile, by adding the amidoxime modified polyacrylonitrile powder and the chitosan, the hydrophilicity of the membrane is significantly improved, so that the pressure required in the using process is significantly reduced, the shear erosion action to the surface of the adsorption material in the process that the seawater passes through the membrane is reduced, the adsorption effect is improved, and the overall requirement of uranium-extraction-from-seawater-seawater desalination cogeneration on adsorption performance and flux is satisfied.

Aiming at the technical difficulty 4: in the present invention, the polyacrylonitrile, the chitosan and the amidoxime modified polyacrylonitrile powder are added into the casting membrane solution to fully exert the synergistic effect among them, so that the prepared membrane featuring uniform membrane compositions and good forming effect further has the characteristics of high flux, high hydrophilicity, high antibacterial performance and high uranium adsorption capacity.

The chitosan has the following effects: (1) the chitosan improves the antibacterial performance of the polyacrylonitrile membrane and prolongs the service life of the membrane; (2) the chitosan improves the hydrophilicity of the polyacrylonitrile membrane and improves the membrane flux; (3) uranyl ions are adsorbed by means of amino and hydroxyl in the chitosan; (4) the chitosan changes the pore canal structures, to that the membrane is adaptive to adsorb the uranium ions in the seawater; and (5) as shown in FIGS. 10A-10E, the chitosan and amidoxime have the synergistic effect in uranium adsorption.

The amidoxime modified polyacrylonitrile powder has the following effects: (1) the amidoxime modified polyacrylonitrile powder improves the compatibility of polyacrylonitrile with low polarity and chitosan with high polarity in the solvent so as to play a role of the linker, so that the membrane prepared by means of phase inversion is uniform and good in forming effect; (2) the amidoxime modified polyacrylonitrile powder adjusts the membrane pore structures, so that the membrane is adaptive to adsorb the uranium ions in the seawater; (3) the amidoxime modified polyacrylonitrile powder improves the uranium adsorption performance of the cogeneration membrane by means of excellent adsorption selectivity of amidoxime groups to the uranium ions, so that the use efficiency of the cogeneration membrane is improved; and (4) oximido and amino are introduced to further improve the hydrophilicity and flux of the cogeneration membrane.

Based on the above inventive conceptions, the present invention finally obtains the polyacrylonitrile-based uranium-extraction-from-seawater-seawater desalination cogeneration membrane by making full use of synergistic effects among the compositions and systematically adjusting the polyacrylonitrile powder modification technology, the formula of the casting membrane solution and the technological conditions of the casting membrane.

In order to achieve the objective of the present invention, the present invention adopts the following technical solution:

A method for preparing a polyacrylonitrile-based uranium-extraction-from-seawater-seawater desalination cogeneration membrane, including the following steps:

S1: preparation of an amidoxime modified polyacrylonitrile powder: weighing a polyacrylonitrile powder and hydroxylamine hydrochloride at a certain mass, putting the polyacrylonitrile powder and hydroxylamine hydrochloride in a solvent for mixing, and adjusting the pH value of a mixing system with sodium hydroxide to maintain the pH value at 6.5-8.5, so as to obtain a mixture A, where the mass ratio of polyacrylonitrile to hydroxylamine hydrochloride is 2:1-1:4, the solvent is a mixed solution of water and ethanol, and the volume ratio of water to ethanol is (5-10):1; moving the mixture A into a three-necked flask for oil bath reflux heating, where the reaction temperature is 40-80° C. and the reaction time is 4-8 h; cooling the mixture to room temperature after the reaction, taking the mixture out and washing the mixture respectively with anhydrous ethanol and deionized water for three times, and subjecting the mixture to freeze drying treatment to remove water in the system, so as to obtain a faint yellow powder B, namely, the amidoxime modified polyacrylonitrile powder; where the molecular weight of the polyacrylonitrile powder in the step is 80,000;

S2: preparation of a casting membrane: subjecting solid materials used in the step to freeze drying treatment, and adding the polyacrylonitrile powder, a chitosan powder, the faint yellow powder B, an organic macromolecular additive and an inorganic salt additive of a certain mass into a solvent to obtain a casting membrane solution C, where the mass fraction of the polyacrylonitrile powder in the casting membrane solution is 8% and the molecular weight thereof is 80,000-150,000; the mass fraction of the chitosan powder is 4% and the molecular weight thereof is 300,000; the mass fraction of the faint yellow powder B is 2-8% and the faint yellow powder is obtained in S1; the mass fraction of the organic macromolecular additive is 15%, and the organic macromolecular additive is one of polyethylene glycol, polyvinylpyrrolidone and polyvinyl alcohol; the mass fraction of the inorganic salt additive is 0.1% and the inorganic salt additive is one of NaCl, $MgCl_2$, $ZnCl_2$ and $CaCO_3$; and the rest is the solvent W, and the solvent W is one of N,N-dimethylformamide, N,N-dimethylacetamide and N-methylpyrrolidone; and S3: preparation of a cogeneration membrane: putting the casting membrane solution in a conical flask, performing magnetic heating and stirring to fully dissolve the mixture in the casting membrane solution C, so as to obtain a homogeneous casting membrane solution D, leaving the prepared casting membrane D still at a constant temperature of 25° C., performing defoaming treatment, then casting the casting membrane solution D to a 275±25 μm solution membrane on a glass substrate by means of manual precise membrane casting equipment, leaving the solution membrane still in air for 20 min, volatilizing a part of the solvent, immersing the solution membrane into a coagulating bath at a constant temperature, taking the solution membrane out after the solution membrane is fully cured, and moving the solution membrane to deionized water for immersion for 24 h, so as to finally obtain the cogeneration membrane E; where the solvent used in the coagulating bath in the step is deionized water at a temperature of 20° C., and a defoaming mode is leaving the solution membrane still for 4 h or leaving the solution membrane still for 20-50 min after ultrasonic treatment for 20-50 min.

Technical Description:

Technical description 1: different from usual polyacrylonitrile modification, the amidoxime modified polyacrylonitrile powder in S1 in the present invention not only plays the role of improving the compatibility of polyacrylonitrile and chitosan in the solvent, but also can adjust the shapes of the membrane pores so as to improve the service performance of the membrane in the cogeneration process. Therefore, the molecular weight of the polyacrylonitrile powder in the step is 80,000. It is harmful to fully exert the effect of polyacrylonitrile as the coupling agent if polyacrylonitrile with higher degree of polymerization is used. On the contrary, if the degree of polymerization of polyacrylonitrile is lower, the compatibility of polyacrylonitrile with the polyacrylonitrile substrate material is reduced.

In S1, the volume ratio of water to ethanol in the solvent is (5-10):1, the mass ratio of polyacrylonitrile to hydroxylamine hydrochloride is 2:1 to 1:4, and the mixture A is moved into the three-necked flask for oil bath flux heating, where the reaction temperature is 40-80° C. and the reaction time is 4-8 h. Under the condition, the obtained amidoxime modified polyacrylonitrile powder can improve the uniform stability of the integral material. The amidoxime modified polyacrylonitrile powder plays the role of connecting polyacrylonitrile and chitosan and has better adsorption performance to the uranium ions as well.

Based on the above objective, aminoximation of polyacrylonitrile in the present invention is different from pure modification of polyacrylonitrile. By adjusting the reaction conditions, the conversion rate of aminoximation of polyacrylonitrile is regulated and controlled. The conversion rate is one of important factors that affect the overall compatibility of the material and adjust the shapes of the membrane pores to enable the material to be adaptive to the cogeneration process. When the conversion rate is low, the membrane is well compatible with the polyacrylonitrile substrate, and the mechanical properties of the membrane are relatively high. However, the ability of the membrane to be blended with chitosan is poor, and the forming effect of the membrane is poor. When the conversion rate is high, the ability of the membrane to be blended with chitosan is good, the forming effect of the membrane is good, the uranium adsorption capacity is high, and the mechanical properties are relatively poor. When the additions of the amidoxime modified polyacrylonitrile powders with different conversation rates, the polyacrylonitrile and the chitosan are integrally regulated and controlled, the shapes of the membrane pores can further be adjusted, so that the membrane meets related requirements of the cogeneration membrane.

In S1, the objective that the heating mode is oil bath refluxing is to guarantee uniform modification reaction. The objective of removing water in the system by way of freeze-drying is that the dispersion effect of the modified polyacrylonitrile is better, and polymer chains further stretch and are not agglomerated, so that the casting membrane solution is more uniform and better in forming effect.

Technical description 2: in S2, the objective of adding chitosan is to improve the hydrophilicity, the antibacterial performance and the adsorption capacity to the uranium ions of the cogeneration membrane. The objective that the addition of chitosan is 4% is to form the membrane after the added amidoxime modified polyacrylonitrile powder is modified while guaranteeing that chitosan can fully exert the above effects in the cogeneration membrane. Furthermore, the membrane forming effect is good, and the membrane is uniform and stable. Experimental results show that when the addition of chitosan is 4%, the cogeneration membrane has the antifouling effect, and however, when the amount of chitosan is further increased, the compatibilities of the compositions is in the casting membrane solution are significantly reduced, and the membrane cannot be prepared by way of phase inversion.

In S2, the objective of adding the amidoxime modified polyacrylonitrile powder is to improve the compatibilities of chitosan and polyacrylonitrile in the solvent, where the modified part in the amidoxime modified polyacrylonitrile powder can be interacted with chitosan, the unmodified part is well compatible with polyacrylonitrile, and the amidoxime modified polyacrylonitrile powder integrally plays a role of the coupling agent to improve the uniform stability of the system, so that the prepared cogeneration membrane is uniform and stable and good in membrane forming effect. The objective that the addition of the amidoxime modified polyacrylonitrile powder is 2-8% is to further adjust the membrane pore structures to improve the selective adsorption capacity of the cogeneration membrane to the uranium ions and to further improve the flux and the hydrophilicity of the cogeneration membrane while guaranteeing that the amidoxime modified polyacrylonitrile powder exerts the above effects in the cogeneration membrane.

Technical description 3: the objective of leaving the casting membrane solution D still in S3 is to remove bubbles generated in the stirring process, so that the prepared membrane is uniform, compact and good in forming effect; deforming treatment by way of ultrasonic treatment can further improve the mixing uniform degree of the compositions so as to prevent the precipitate layering phenomenon of the casting membrane solution and can further achieve a better defoaming effect on the other hand; and the objective of moving the cured membrane into the deionized water for immersion for 24 h is to remove residual solvent in the phase conversion process.

The Present Invention has the Beneficial Effects:

1. The prepared polyacrylonitrile-based uranium-extraction-from-seawater-seawater desalination cogeneration membrane is uniform and good in forming effect, and further has the characteristics of high flux, high uranium adsorption performance and antibacterial performance. The related requirements on the membrane in the uranium-extraction-from-seawater-seawater desalination cogeneration process are satisfied.

2. The flux of the polyacrylonitrile-based uranium-extraction-from-seawater-seawater desalination cogeneration membrane prepared by the preparation method is significantly increased.

3. The polyacrylonitrile-based uranium-extraction-from-seawater-seawater desalination cogeneration membrane prepared by the preparation method is uniform, and the adsorption performance thereof is significantly improved.

4. Compared with the unmodified polyacrylonitrile membrane, the hydrophilicity of the polyacrylonitrile-based uranium-extraction-from-seawater-seawater desalination cogeneration membrane prepared by the preparation method is significantly improved.

5. The polyacrylonitrile-based uranium-extraction-from-seawater-seawater desalination cogeneration membrane prepared by the preparation method has the antibacterial performance and has a better sterilizing effect on marine bacteria, *Staphylococcus aureus* and *Escherichia coli*.

BRIEF DESCRIPTION OF THE DRAWINGS

FIG. 1B—a scanning electron micrograph of a surface aminoximated modified polyacrylonitrile membrane; FIG. 1C—a scanning electron micrograph of a chitosan-polyacrylonitrile membrane; and FIG. 1D—a scanning electron micrograph of a polyacrylonitrile-based cogeneration membrane in the embodiment 3.

DETAILED DESCRIPTION OF THE EMBODIMENTS

Figure 1A:
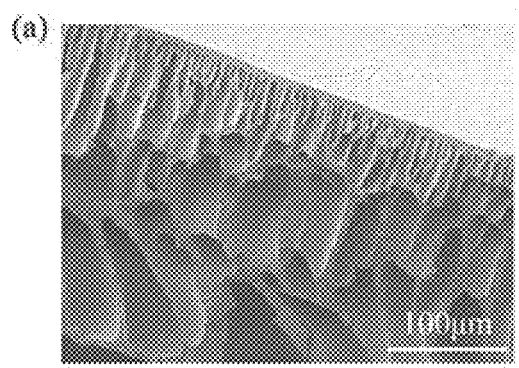
FIG. 1A—a scanning electron micrograph of a polyacrylonitrile membrane.
Figure 1B:
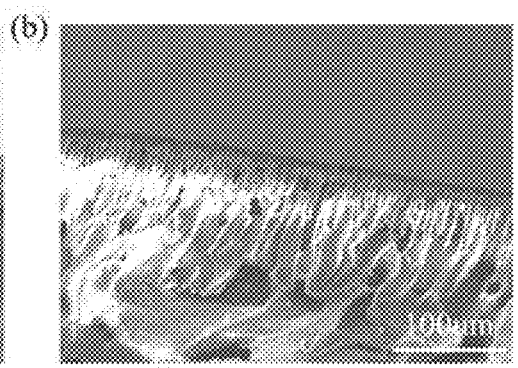
Figure 1C:
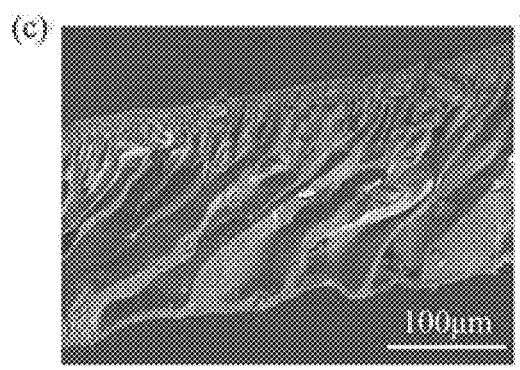

The present invention will be described in detail below in combination with specific embodiments. The embodiments below contribute to further understanding the present invention by those skilled in the art but do not limit the present invention in any form. It should be noted that variations and improvements still can be made by those skilled in the technical field without departing the concept of the present invention. These fall into the protection scope of the present invention.

EXAMPLE 1

A method for preparing a polyacrylonitrile-based uranium-extraction-from-seawater-seawater desalination cogeneration membrane, including the following steps:

S1: preparation of an amidoxime modified polyacrylonitrile powder: a polyacrylonitrile powder and hydroxylamine hydrochloride at a certain mass were weighed, the polyacrylonitrile powder and hydroxylamine hydrochloride were put in a solvent for mixing, and the pH value of a mixing system was adjusted with sodium hydroxide to maintain the pH value at 6.5-8.5, so as to obtain a mixture A, where the mass ratio of polyacrylonitrile to hydroxylamine hydrochloride was 2: 1-1:4, the solvent was a mixed solution of water and ethanol, and the volume ratio of water to ethanol was (5-10): 1; the mixture A was moved into a three-necked flask for oil bath reflux heating, where the reaction temperature was 40-80° C. and the reaction time was 4-8 h; the mixture was cooled to room temperature after the reaction, the mixture was taken out and the mixture was washed respectively with anhydrous ethanol and deionized water for three times, and the mixture was subjected to freeze drying treatment to remove water in the system, so as to obtain a faint yellow powder B, namely, the amidoxime modified polyacrylonitrile powder; where the molecular weight of the polyacrylonitrile powder in the step was 80,000;

S2: preparation of a casting membrane: solid materials used in the step was subjected to freeze drying treatment, and the polyacrylonitrile powder, a chitosan powder, the faint yellow powder B, an organic macromolecular additive and an inorganic salt additive of a certain mass were added into a solvent to obtain a casting membrane solution C, where the mass fraction of the polyacrylonitrile powder in the casting membrane solution C was 8% and the molecular weight thereof was 80,000-150,000; the mass fraction of the chitosan powder was 4% and the molecular weight thereof was 300,000; the mass fraction of the faint yellow powder B was 2-8% and the faint yellow powder was obtained in S1; the mass fraction of the organic macromolecular additive was 15%, and the organic macromolecular additive was one of polyethylene glycol, polyvinylpyrrolidone and polyvinyl alcohol; the mass fraction of the inorganic salt additive was 0.1% and the inorganic salt additive was one of NaCl, $MgCl_2$, $ZnCl_2$ and $CaCO_3$; and the rest was the solvent W, and the solvent W was one of N,N-dimethylformamide, N,N-dimethylacetamide and N-methylpyrrolidone; and S3: preparation of a cogeneration membrane: the casting membrane solution was put in a conical flask, magnetic heating and stirring were performed to fully dissolve the mixture in the casting membrane solution C, so as to obtain a homogeneous casting membrane solution D, the prepared casting membrane D was left still at a constant temperature of 25° C., defoaming treatment was performed, then the casting membrane solution D was casted to a 275±25 μm solution membrane on a glass substrate by means of manual precise membrane casting equipment, the solution membrane was left still in air for 20 min, a part of the solvent was volatilized, the solution membrane was immersed into a coagulating bath at a constant temperature, the solution membrane was taken out after the solution membrane was fully cured, and the solution membrane was moved to deionized water for immersion for 24 h, so as to finally obtain the cogeneration membrane E; where the solvent used in the coagulating bath in the step was deionized water at a temperature of 20° C., and a defoaming mode was leaving the solution membrane still for 4 h or leaving the solution membrane still for 20-50 min after ultrasonic treatment for 20-50 min.

EXAMPLE 2

A method for preparing a polyacrylonitrile-based uranium-extraction-from-seawater-seawater desalination cogeneration membrane, where the example is substantially the same with the example 1, and the difference lies in that in S1, the mass ratio of polyacrylonitrile to hydroxylamine hydrochloride is 1:2.5, the volume ratio of water to ethanol is 9:1, the reaction temperature is 65° C., the reaction time is 6 h, and the pH value of the system is 7.5.

Technical description: experimental studies show that the amidoxime modified polyacrylonitrile powder prepared under the above experimental conditions is moderate in amidoxime conversion rate and can fully exert the effect as the coupling agent. The cogeneration membrane prepared from the amidoxime modified polyacrylonitrile powder prepared under the condition features good mechanical properties and forming effect. The objective that the volume ratio of water to ethanol is 9:1 is to play a role of activating the system without damaging the structure of the polyacrylonitrile membrane of the substrate.

EXAMPLE 3

A method for preparing a polyacrylonitrile-based uranium-extraction-from-seawater-seawater desalination cogeneration membrane, where the example is substantially the same with the example 2, and the difference lies in that in S2, the mass fraction of the faint yellow powder B in the casting membrane solution C is 4%.

Technical description: experimental studies show that by adding the faint yellow powder B with the mass fraction of 4% into the casting membrane solution C, the faint yellow powder B plays the role as the coupling agent to improve the blending effect of the polyacrylonitrile powder and the chitosan powder, so that the prepared membrane is uniformed and good in forming effect, and the pore structures of the cogeneration membrane are looser. The porous structures in the cogeneration membrane can further be adjusted to increase microporous structures in the cogeneration membrane, so that the uranium adsorption selectivity, the membrane flux and the hydrophilicity are improved.

Figure 2:
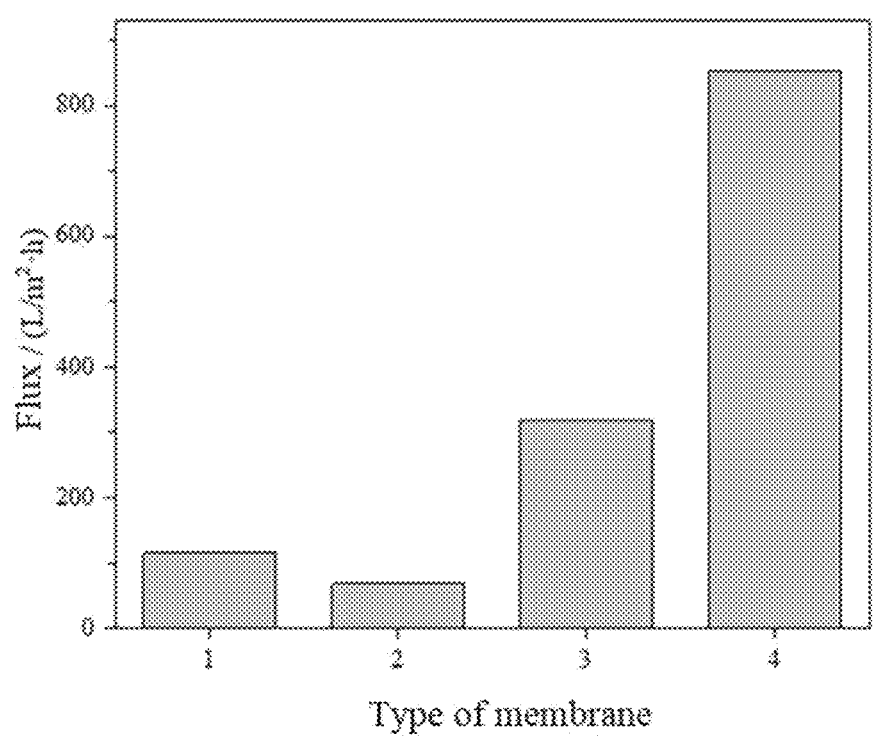
FIG. 2: a water flux diagram of (1) the polyacrylonitrile membrane; (2) the surface aminoximated modified polyacrylonitrile membrane; (3) the chitosan-polyacrylonitrile membrane; (4) the polyacrylonitrile-based cogeneration membrane in the embodiment 3 (P=0.1 MPa, the membrane thickness=275±25 μm).

The flux of the polyacrylonitrile-based uranium-extraction-from-seawater-seawater desalination cogeneration membrane prepared by the preparation method in the example is 7.4 times of that of the polyacrylonitrile membrane, 2.7 times of that of the chitosan-polyacrylonitrile blend membrane and 12.5 times of that of the surface aminoximated modified polyacrylonitrile membrane, as shown in FIG. 2.

Figure 1D:
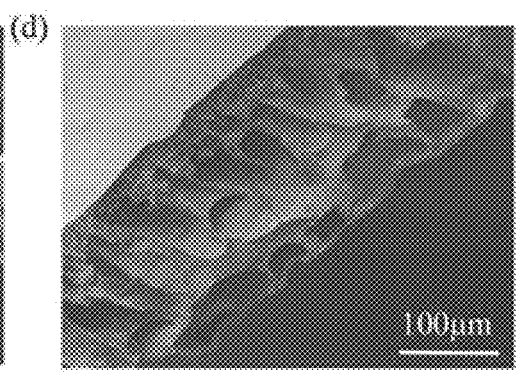
Figure 3:
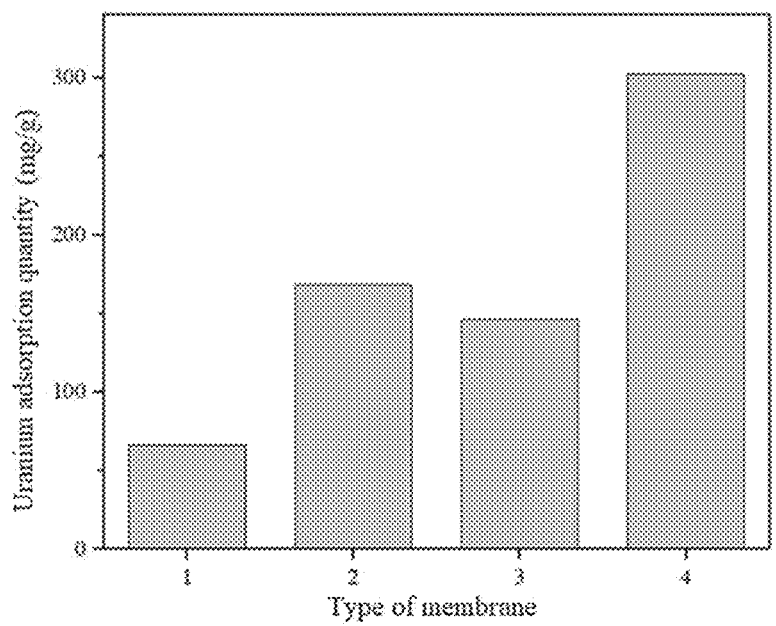
FIG. 3: an uranium adsorption capacity diagram of (1) the polyacrylonitrile membrane; (2) the surface aminoximated modified polyacrylonitrile membrane; (3) the chitosan-polyacrylonitrile membrane; (4) the polyacrylonitrile-based cogeneration membrane in the embodiment 3 (pH=8, $C_0$=50 mg/L, V=500 mL, m=50 mg, T=25° C., t=48 h).

The polyacrylonitrile-based uranium-extraction-from-seawater-seawater desalination cogeneration membrane prepared by the preparation method in the example is uniform. Compared with the surface aminoximated modified polyacrylonitrile membrane and the chitosan-polyacrylonitrile blend membrane, the porous structures are looser and the microporous structures are increased, as shown in FIG. 1D, resulting in further improvement of the adsorption performance on the uranium ions. Under conditions that the pH value is 8 (the pH value of the seawater is about 8.3), the concentration of the initial uranium solution is 50 mg/L, the volume of the uranium solution is 500 mL, the reaction time is 48 h, and the mass of the adsorbent is 50 mg, the adsorption capacity of the polyacrylonitrile-based uranium-extraction-from-seawater-seawater desalination cogeneration membrane is 4.5 times of that of the unmodified polyacrylonitrile membrane, 2.1 times of that of the chitosan-polyacrylonitrile blend membrane and 1.8 times of that of the surface aminoximated modified polyacrylonitrile membrane, as shown in FIG. 3.

Figure 4:
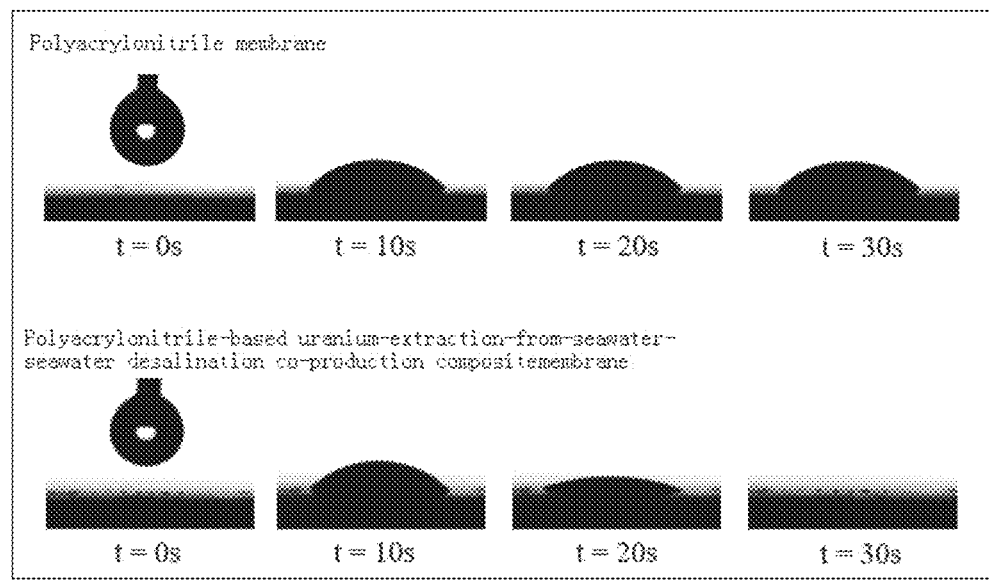
FIG. 4: a water contact angle diagram of the polyacrylonitrile membrane and the polyacrylonitrile-based cogeneration membrane in the embodiment 3.

Compared with the unmodified polyacrylonitrile membrane, the hydrophilicity of the polyacrylonitrile-based uranium-extraction-from-seawater-seawater desalination cogeneration membrane prepared by the preparation method in the example is significantly improved, as shown in FIG. 4.

Figure 5:
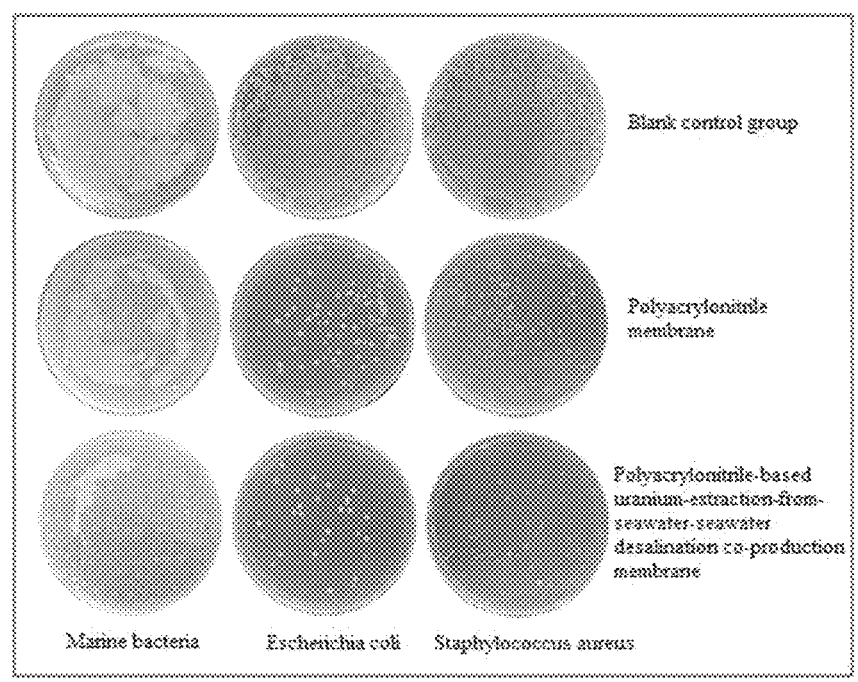
FIG. 5: an antibacterial performance diagram of the polyacrylonitrile membrane and the polyacrylonitrile-based cogeneration membrane in the embodiment 3.

The antibacterial performance of the polyacrylonitrile-based uranium-extraction-from-seawater-seawater desalination cogeneration membrane prepared by the preparation method in the example is significantly improved, and compared with the original polyacrylonitrile membrane, the sterilizing effect of the polyacrylonitrile-based uranium-extraction-from-seawater-seawater desalination cogeneration membrane on marine bacteria, *Staphylococcus aureus* and *Escherichia coli* is significantly improved, as shown in FIG. 5.

EXAMPLE 4

A method for preparing a polyacrylonitrile-based uranium-extraction-from-seawater-seawater desalination cogeneration membrane, where the example is substantially the same with the example 3, and the difference lies in that in S2, in the casting membrane solution C, the solvent was N,N-dimethylacetamide, the organic macromolecular additive was polyvinylpyrrolidone, and the inorganic salt additive was NaCl; and in S3, the heating temperature at which the casting membrane solution C was heated and stirred was 45° C., and the stirring speed was 300 r/min; and the defoaming mode was leaving the casting membrane solution C still for 40 min after ultrasonic treatment for 40 min.

Technical description: experimental studies show that when the solvent is N,N-dimethylacetamide, the compatibility among the amidoxime modified polyacrylonitrile powder, the chitosan powder and the polyacrylonitrile powder is the best; when the heating temperature at which the casting membrane solution C is heated and stirred is 45° C. and the stirring speed is 300 r/min, structures of the polyacrylonitrile, the chitosan and the amidoxime modified polyacrylonitrile are not damaged while accelerated mixing can be guaranteed. The defoaming process is leaving the casting membrane solution C still for 40 min after ultrasonic treatment for 40 min, which not only improves the mixing degree of uniformity of the compositions, but also can achieve a better defoaming effect.

EXAMPLE 5

A method for preparing a polyacrylonitrile-based uranium-extraction-from-seawater-seawater desalination cogeneration membrane, where the example is substantially the same with the example 1, and the difference lies in that in S1, the mass ratio of polyacrylonitrile to hydroxylamine hydrochloride is 1:1, the volume ratio of water to ethanol is 9:1, the reaction temperature is 50° C., the reaction time is 4 h, and the pH value of the system is 7.5; and in S2, in the casting membrane solution C, the mass fraction of the faint yellow powder B is 2-8%.

Technical description: experimental studies show that the amidoxime conversion rate of the amidoxime modified polyacrylonitrile powder prepared under the above experimental conditions is low, and there are few modified parts in the modifying material, resulting in better compatibility with the polyacrylonitrile substrate material.

But the interaction with the chitosan is weakened.

EXAMPLE 6

A method for preparing a polyacrylonitrile-based uranium-extraction-from-seawater-seawater desalination cogeneration membrane, where the example is substantially the same with the example 5, and the difference lies in that in S2, in the casting membrane solution C, the mass fraction of the faint yellow powder B is 8%, the mass fraction of the polyacrylonitrile powder in the casting membrane solution C is 8%, and the molecular weight thereof is 150,000; in the casting membrane solution C, the solvent is N,N-dimethylacetamide, the organic macromolecular additive is polyvinylpyrrolidone, and the inorganic salt additive is NaCl; and in S3, the heating temperature at is 45° C., and the stirring speed is 300 r/min; and the defoaming mode is leaving the casting membrane solution C still for 50 min after ultrasonic treatment for 50 min.

Figures 6A, 6B:
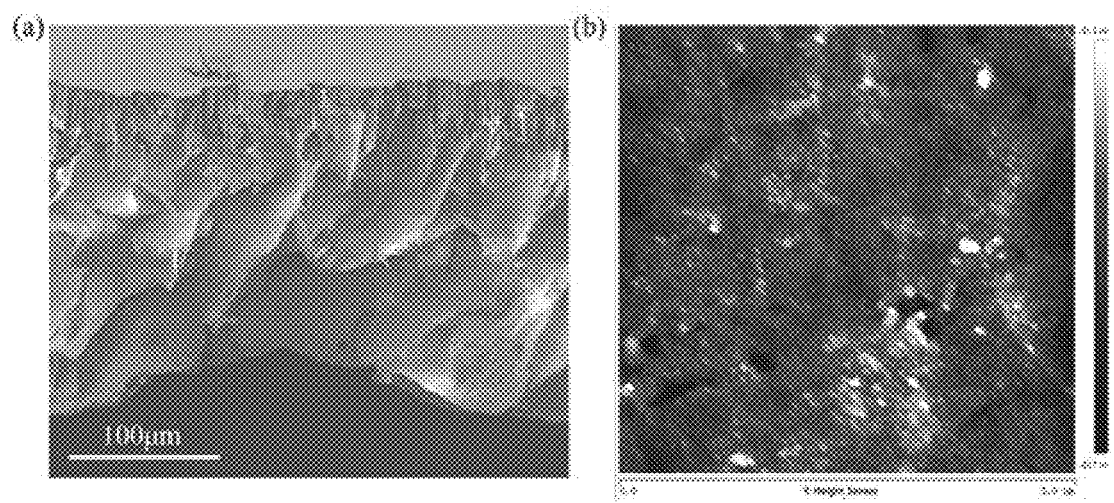
FIG. 6A: a scanning electron micrograph
FIG. 6B: an atomic force microscope figure of the cogeneration membrane in the embodiment 6.

Technical description: the membrane material in the example is shown in FIG. 6A and FIG. 6B. By further adding the faint yellow powder B with the mass fraction of 8%, it can be guaranteed that the compatibility with the chitosan is relatively improved and the adsorption sites are further increased in the premise that the faint yellow powder B plays a role as the coupling agent. The mass fraction of the polyacrylonitrile powder is 8% and the molecular weight thereof is 150,000, which contributes to improving the overall technical properties of the material.

Experimental studies show that when the solvent is N,N-dimethylacetamide, the compatibility among the amidoxime modified polyacrylonitrile powder, the chitosan powder and the polyacrylonitrile powder is the best; when the heating temperature at which the casting membrane solution C is heated and stirred is 45 t and the stirring speed is 300 r/min, structures of the polyacrylonitrile, the chitosan and the amidoxime modified polyacrylonitrile are not damaged while accelerated mixing can be guaranteed. The defoaming process is leaving the casting membrane solution C still for 50 min after ultrasonic treatment for 50 min, which not only improves the mixing degree of uniformity of the compositions, but also can achieve a better defoaming effect.

In the examples 5-6, by way of reducing the conversion rate of polyacrylonitrile and optimizing the membrane casting process, the cogeneration membranes with high mechanical properties can be prepared. As the conversion rate is reduced, the compatibility with the chitosan is reduced. By changing the addition of the faint yellow powder B, the compatibility between polyacrylonitrile and chitosan can be improved, and the membrane forming process is further adjusted to prepare the high performance cogeneration membrane. This type of cogeneration membranes is low in amidoxime conversion rate and has a good bonding capacity with polyacrylonitrile. The molecular weight of polyacrylonitrile is 150,000. As shown in FIG. 6A and FIG. 6B, the cogeneration membranes are compact in overall structure and have better mechanical properties.

EXAMPLE 7

A method for preparing a polyacrylonitrile-based uranium-extraction-from-seawater-seawater desalination cogeneration membrane, where the example is substantially the same with the example 1, and the difference lies in that in S1 in the example 1, the mass ratio of polyacrylonitrile to hydroxylamine hydrochloride is 1:4, the volume ratio of water to ethanol is 9:1, the reaction temperature is 75° C., the reaction time is 8 h, and the pH value of the system is 7.5; and in S2, in the casting membrane solution C, the mass fraction of the faint yellow powder B is 2-8%.

Technical description: experimental studies show that the amidoxime conversion rate of the amidoxime modified polyacrylonitrile powder prepared under the above experimental conditions is relatively high, and there are more modified parts in the modifying material, resulting in enhanced interaction with the chitosan. The membrane pores are relatively loose, there are more microporous structures, and the membrane flux is increased to some extent, which contributes to adsorbing the uranium ions. However, as there are few unmodified parts in the modifying material, the bonding capacity with the polyacrylonitrile substrate is weakened, so that the mechanical properties of the prepared membrane are slightly reduced.

EXAMPLE 8

A method for preparing a polyacrylonitrile-based uranium-extraction-from-seawater-seawater desalination cogeneration membrane, where the example is substantially the same with the example 7, and the difference lies in that in S2, in the casting membrane solution C, the mass fraction of the faint yellow powder B is 2%, the mass fraction of the polyacrylonitrile powder is 8%, and the molecular weight thereof is 80,000; in the casting membrane solution C, the solvent is further N,N-dimethylacetamide, the organic macromolecular additive is further polyvinylpyrrolidone, and the inorganic salt additive is further NaCl; and in S3, the heating temperature at is 40-60° C., and the stirring speed is 200-400 r/min, and preferably, the heating temperature is 45° C. and the stirring speed is 300 r/min; and the defoaming mode is leaving the casting membrane solution C still for 30 min after ultrasonic treatment for 30 min. A method for preparing a polyacrylonitrile-based uranium-extraction-from-seawater-seawater desalination cogeneration membrane, where the example is substantially the same with the example 7, and the difference lies in that in S2, in the casting membrane solution C, the mass fraction of the faint yellow powder B is 2%, the mass fraction of the polyacrylonitrile powder is 8%, and the molecular weight thereof is 80,000; in the casting membrane solution C, the solvent is N,N-dimethylacetamide, the organic macromolecular additive is polyvinylpyrrolidone, and the inorganic salt additive is NaCl; and in S3, the heating temperature at is 45° C., and the stirring speed is 300 r/min; and the defoaming mode is leaving the casting membrane solution C still for 30 min after ultrasonic treatment for 30 min.

Technical description: the faint yellow powder B with the mass fraction of 2% is further added, and the mass fraction of the polyacrylonitrile powder is 8% and the molecular weight thereof is 80,000, so that the overall compatibility of the casting membrane solution can be improved.

Figure 7A:
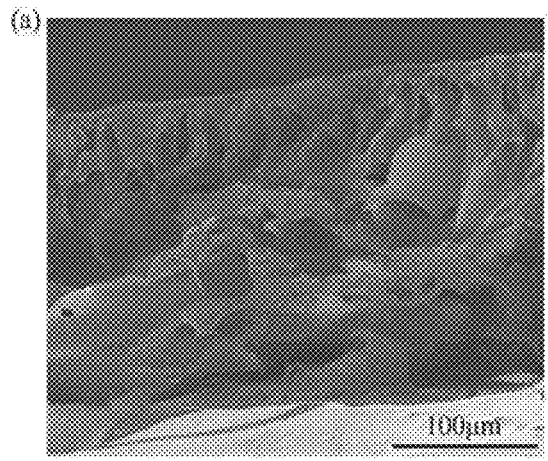
FIG. 7A: a scanning electron micrograph
Figure 7B:
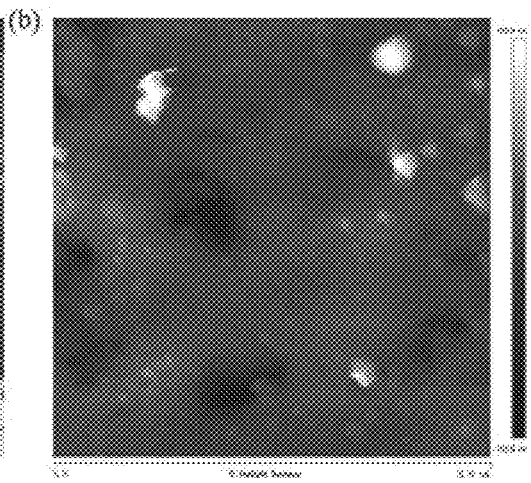
FIG. 7B: an atomic force microscope figure of the cogeneration membrane in the embodiment 8.

In the examples 7-8, by way of increasing the conversion rate of polyacrylonitrile and optimizing the membrane casting process, the cogeneration membranes with high antibacterial performance and high adsorption performance are prepared. Increase of the amidoxime conversion ratio directly results in increase of the density of the active sites in amidoxime groups and chitosan, so that the adsorption capacity is improved. As increase of the quantity of chitosan results in further reduction of uniformity of the original polyacrylonitrile solution, the function of the pore-foaming agent to prepare pore canals is further weakened, so that the membrane pores are relatively loose, there are more the microporous structures, and a lot of transverse pore canals appear, as shown in FIG. 7A and FIG. 7B, so that the shear erosion action of the water flow to the surface of the material is effectively reduced, the effective contact between the uranium ions and the membrane material is increased, and the adsorption performance is improved. Compared with the membrane in the example 3, the adsorption performance of the membrane is increased by 10.1%.

EXAMPLE 9

A method for preparing a polyacrylonitrile-based uranium-extraction-from-seawater-seawater desalination cogeneration membrane, where the method includes preparation of a bottom casting membrane solution, preparation of an interlayered casting membrane solution, preparation of a top casting membrane solution and preparation of a cogeneration membrane.

Preparation of the bottom casting membrane solution: the method for preparing the bottom casting membrane solution is the same with S1 and S2 in the example 5 to obtain a casting membrane solution F;

preparation of the interlayer casting membrane solution: the method for preparing the interlayered casting membrane solution is the same with S1 and S2 in the example 3 to obtain a casting membrane solution G;

preparation of the top casting membrane solution: the method for preparing the bottom casting membrane solution is the same with S1 and S2 in the example 7 to obtain a casting membrane solution H;

preparation of the cogeneration membrane: the casting membrane solutions F, G and H were respectively placed in conical flasks for magnetic heating and stirring treatment, where the heating temperature was 45° C. and the stirring speed was 300 r/min; when the compositions in the three casting membrane solutions were uniformly mixed, the casting membrane solutions were left still at a constant temperature of 25° C. for defoaming treatment; then the casting membrane solution F was casted to a bottom membrane with thickness of 100±20 μm on a glass substrate by means of manual precise membrane casting equipment, the bottom membrane was left still for 1-5 min, the casting membrane solution G was casted to an interlayered membrane with thickness of 100±20 μm on the bottom membrane by means of the manual precise membrane casting equipment, the interlayered membrane was left still for 1-5 min, the casting membrane solution H was casted to a top membrane with thickness of 100±20 μm on the interlayered membrane by means of the manual precise membrane casting equipment, and the top membrane was left still for 20-30 min, then the top membrane was immersed into a coagulating bath at a constant temperature, the membrane was taken out after the membrane was fully cured, and the membrane was moved to deionized water for immersion for 24 h, so as to finally obtain the cogeneration membrane I; in the step, the solvent in the coagulating bath was deionized water at a temperature of 20° C., and the defoaming mode was leaving the membrane still for 4 h.

The polyacrylonitrile-based uranium-extraction-from-seawater-seawater desalination cogeneration membrane prepared in the example is formed by compounding three membranes, where the mass ratio of the polyacrylonitrile powder, the chitosan and the bottom amidoxime modified polyacrylonitrile powder in the bottom membrane is 8:4: (2-8), the molecular weight of the polyacrylonitrile powder is 8,000-150,000, and the bottom amidoxime modified polyacrylonitrile powder is obtained by the preparation method in S1 in the example 5; the mass ratio of the polyacrylonitrile powder, the chitosan and the interlayered amidoxime modified polyacrylonitrile powder in the interlayered membrane is 8:4:4, the molecular weight of the polyacrylonitrile powder is 8,000-150,000, and the interlayered amidoxime modified polyacrylonitrile powder is obtained by the preparation method in S1 in the example 3; and the mass ratio of the polyacrylonitrile powder, the chitosan and the top amidoxime modified polyacrylonitrile powder in the top membrane is 8:4: (2-8), the molecular weight of the polyacrylonitrile powder is 8,000-150,000, and the top amidoxime modified polyacrylonitrile powder is obtained by the preparation method in S1 in the example 7.

Technical description: the cogeneration membrane is designed according to the actual condition when the seawater passes through the membrane. When passing through the membrane, the seawater first contacts with the top membrane. Therefore, the adsorption performance and the antibacterial performance of the top membrane are more prominent. The uranium adsorption performance, the antibacterial performance, the mechanical properties and the hydrophilicity of the interlayered membrane are moderate. The bottom membrane has good mechanical properties and mainly plays a fixing and supporting role. As the three membranes are similar in structure and can be casted almost simultaneously, the three membranes are very good in compatibility.

EXAMPLE 10

The example is substantially the same with the example 9, and the difference lies in that in the casting membrane solution C in preparation of the bottom casting membrane solution, the mass fraction of the faint yellow powder B is 8%, the mass fraction of the polyacrylonitrile powder in the casting membrane solution C is 8%, and the molecular weight thereof is 150,000; in the casting membrane solution C, the solvent is further N,N-dimethylacetamide, the organic macromolecular additive is further polyvinylpyrrolidone, and the inorganic salt additive is further NaCl; in the casting membrane solution C in preparation of the top casting membrane solution, the mass fraction of the faint yellow powder B is 2%, the mass fraction of the polyacrylonitrile powder is 8%, and the molecular weight thereof is 80,000; and in the casting membrane solution C, the solvent is further N,N-dimethylacetamide, the organic macromolecular additive is further polyvinylpyrrolidone, and the inorganic salt additive is further NaCl.

The difference of the polyacrylonitrile-based uranium-extraction-from-seawater-seawater desalination cogeneration membrane prepared in the example 9 lies in that the mass ratio of the polyacrylonitrile powder, the chitosan and the bottom amidoxime modified polyacrylonitrile powder in the bottom membrane is 8:4:8, and the molecular weight of the polyacrylonitrile is 150,000; and the mass ratio of the polyacrylonitrile powder, the chitosan and the top amidoxime modified polyacrylonitrile powder in the top membrane is 8:4:2, and the molecular weight of the polyacrylonitrile is 8,000.

Technical description: the objective that the faint yellow powder B with the mass fraction of 8% the polyacrylonitrile powder the mass fraction of 8% and the molecular weight thereof 150,000 is added into the bottom casting membrane solution and the mass fraction of the polyacrylonitrile powder is 8% and the molecular weight thereof is 150,000 is to fully play a role of fixing and supporting the bottom membrane to further improve the mechanical properties of the composite membrane, thereby improving the compatibility with chitosan and increasing the adsorption sites in the premise of guaranteeing that the faint yellow powder B plays a role as the coupling agent. The objective that the faint yellow powder B with the mass fraction of 2% the polyacrylonitrile powder the mass fraction of is 8% and the molecular weight thereof is 80,000 is added into the top casting membrane solution and the mass fraction of the polyacrylonitrile powder is 8% and the molecular weight thereof is 80,000 is to further improve the hydrophilicity, the antibacterial performance and the uranium adsorption capacity of the composite membrane, as shown in FIG. 9A-FIG. 9D.

Figure 8A:
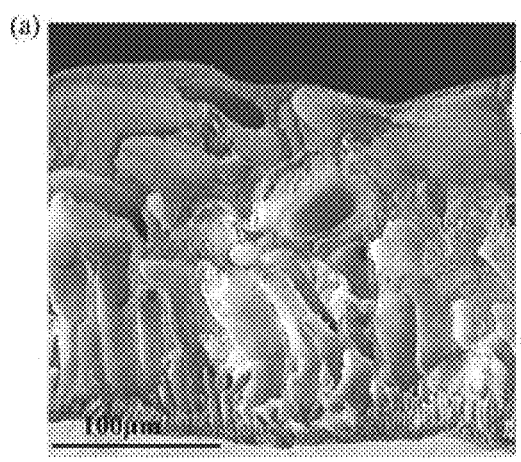
FIG. 8A: a scanning electron micrograph
Figure 8B:
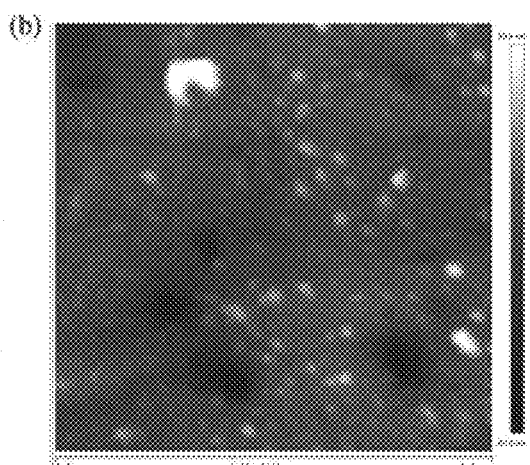
FIG. 8B: an atomic force microscope figure of the cogeneration membrane in the embodiment 10.

The polyacrylonitrile-based uranium-extraction-from-seawater-seawater desalination cogeneration composite membrane prepared by the preparation method in the example is of a three-layered structure, as shown in FIG. 8A-FIG. 8B.

Figure 9A:
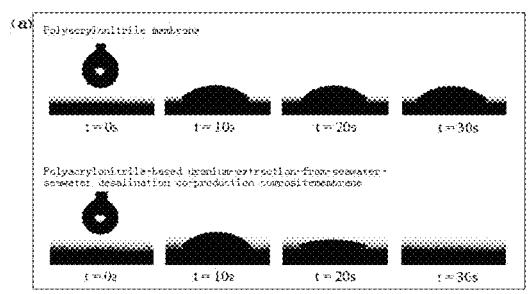
FIG. 9A: a water contact angle diagram.

Compared with the polyacrylonitrile membrane, the hydrophilicity of the polyacrylonitrile-based uranium-extraction-from-seawater-seawater desalination cogeneration composite membrane prepared by the preparation method in the example is significantly improved, as shown in FIG. 9A.

Figure 9B:
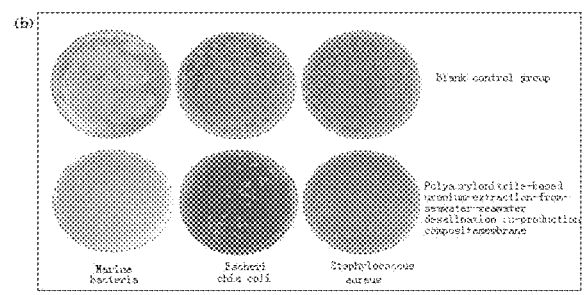
FIG. 9B: an antibacterial performance diagram.

The antibacterial performance of the polyacrylonitrile-based uranium-extraction-from-seawater-seawater desalination cogeneration joint-process composite membrane prepared by the preparation method in the example is significantly improved, and compared with the polyacrylonitrile membrane, the sterilizing effect of the polyacrylonitrile-based uranium-extraction-from-seawater-seawater desalination cogeneration joint-process membrane on marine bacteria, *Staphylococcus aureus* and *Escherichia coli* is significantly improved, as shown in FIG. 9B.

Figure 9C:
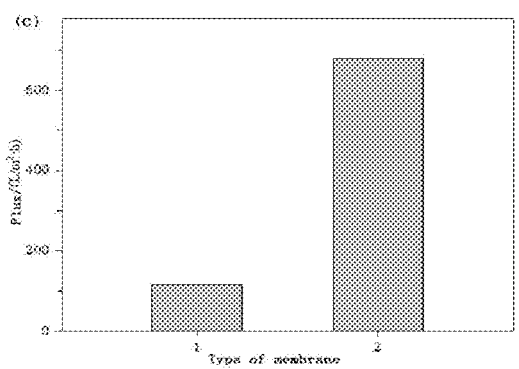
FIG. 9C: a water flux diagram of the cogeneration membrane in the embodiment 10, where (1) is the polyacrylonitrile membrane; and (2) is the polyacrylonitrile-based cogeneration membrane.

The flux of the polyacrylonitrile-based uranium-extraction-from-seawater-seawater desalination cogeneration composite membrane prepared by the preparation method in the example is 5.9 times of that of the polyacrylonitrile membrane, as shown in FIG. 9C.

Figure 9D:
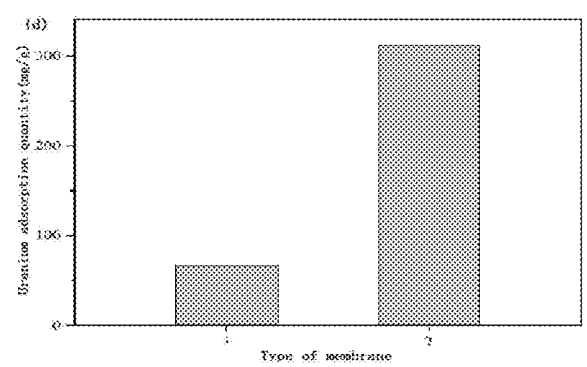
FIG. 9D: an adsorption performance diagram thereof, where (1) is the polyacrylonitrile membrane; and (2) is the polyacrylonitrile-based cogeneration membrane.
Figure 10A:
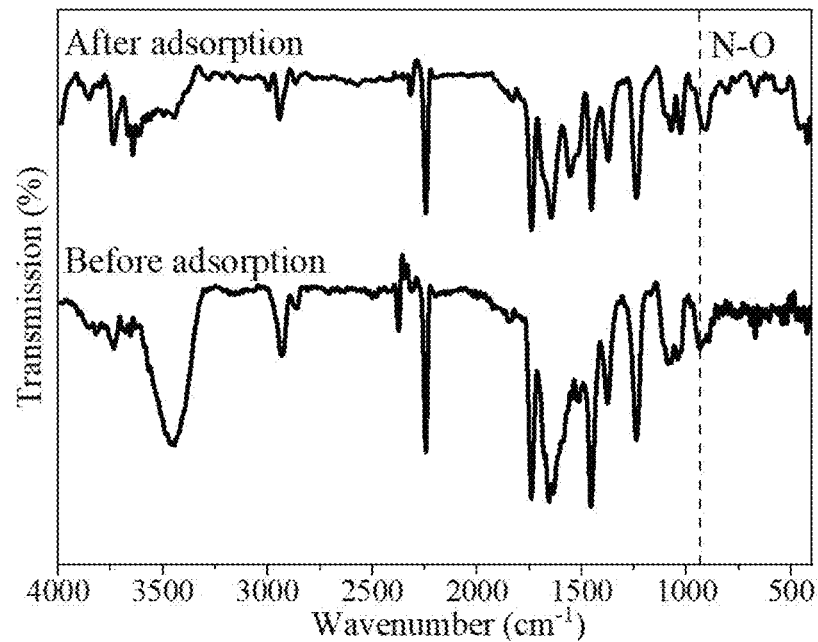
FIG. 10A: FT-IR spectrograms.
Figure 10B:
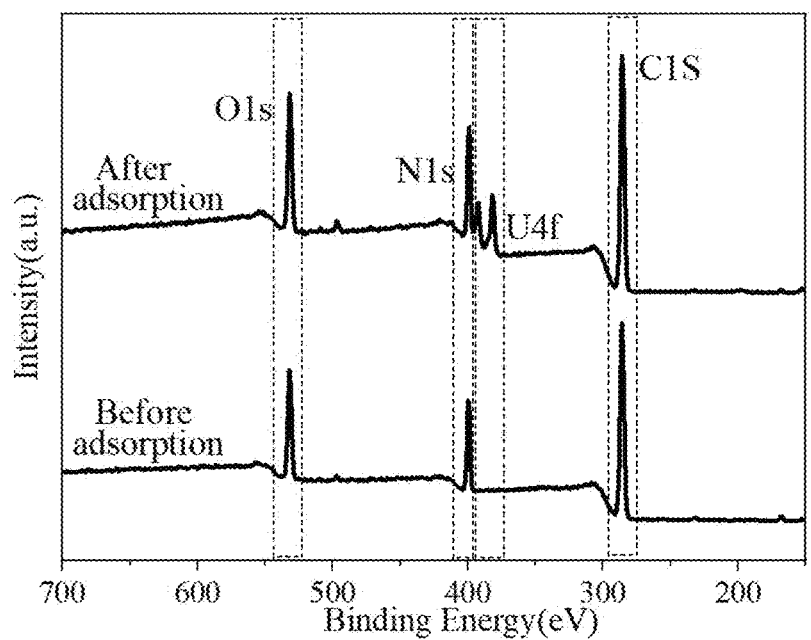
FIG. 10B—FIG. 10D: XPS spectrograms
Figure 10C:
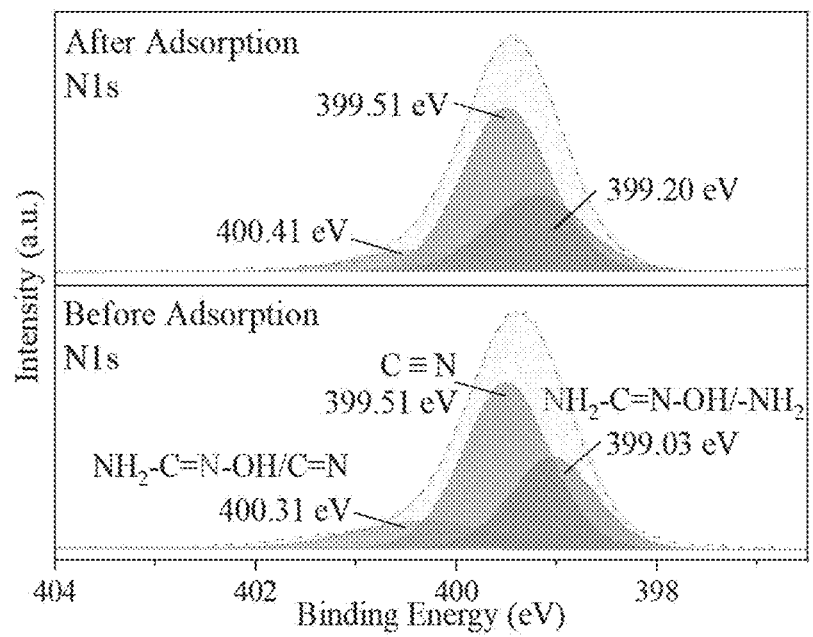
Figure 10D:
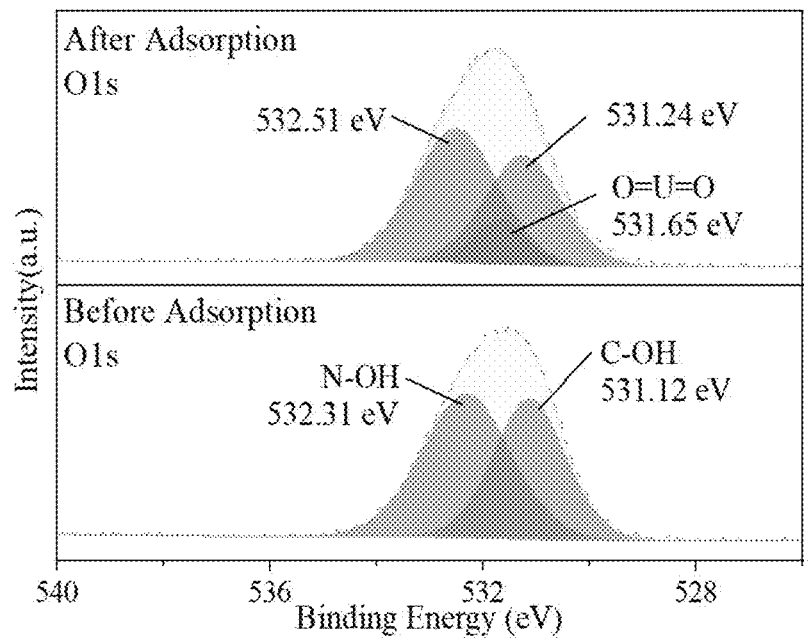
Figure 10E:
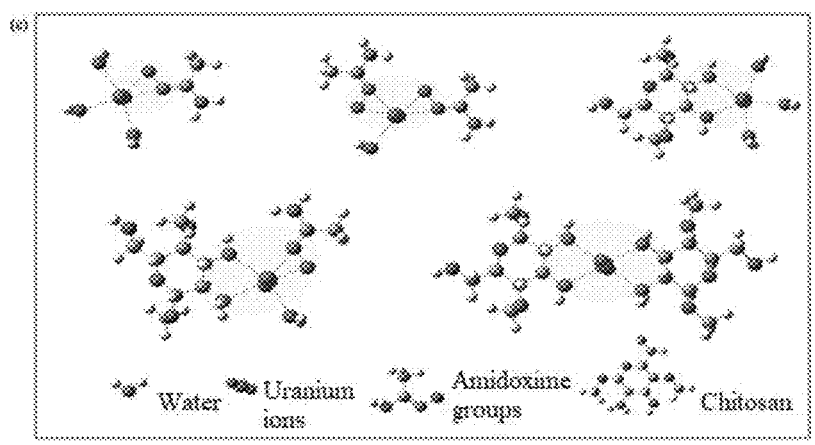
FIG. 10E: DFT theoretical simulated diagrams of the polyacrylonitrile-based cogeneration membrane before and after uranium adsorption.
Figure 11:
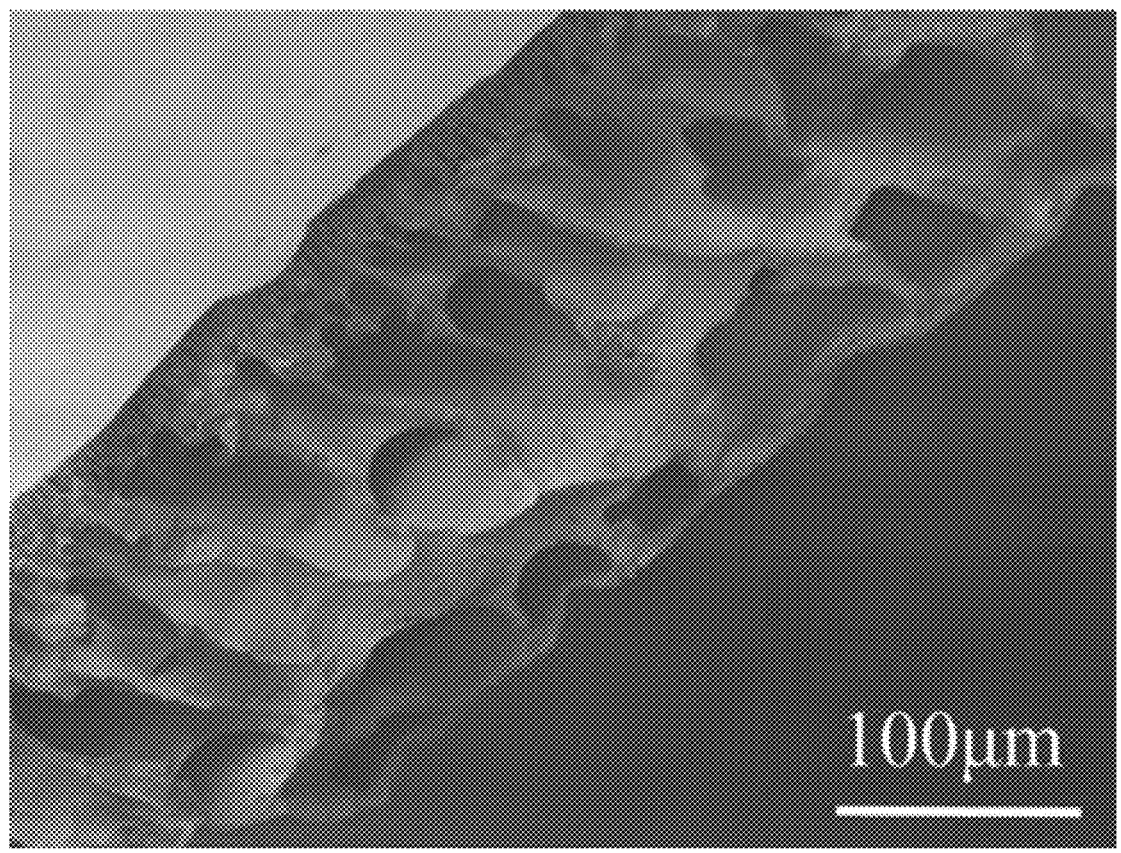
FIG. 11: a scanning electron micrograph of the polyacrylonitrile-based cogeneration membrane in the embodiment 3.

The adsorption capacity of the polyacrylonitrile-based uranium-extraction-from-seawater-seawater desalination cogeneration composite membrane prepared by the preparation method in the example is 4.6 times of that of the polyacrylonitrile membrane under conditions that the pH value is 8 (the pH value of the seawater is about 8.3), the concentration of the initial uranium solution is 50 mg/L, the volume of the uranium solution is 500 mL, the reaction time is 48 h, and the mass of the adsorbent is 50 mg, as shown in FIG. 9D.

The invention claimed is:

1. A method for preparing a polyacrylonitrile-based uranium-extraction-from-seawater-seawater desalination cogeneration membrane, comprising the following steps:

S1: preparation of an amidoxime modified polyacrylonitrile powder: weighing a polyacrylonitrile powder and hydroxylamine hydrochloride at a predetermined mass, putting the polyacrylonitrile powder and the hydroxylamine hydrochloride in a first solvent for mixing, and adjusting a pH value of a mixing system with sodium hydroxide to maintain the pH value at 6.5-8.5 to obtain a mixture A, wherein a mass ratio of the polyacrylonitrile powder to the hydroxylamine hydrochloride is 2:1-1:4, the first solvent is a mixed solution of water and ethanol, and a volume ratio of the water to the ethanol is (5-10): 1; moving the mixture A into a three-necked flask for an oil bath reflux heating, wherein a reaction temperature is 40-80° C. and a reaction time is 4-8 h; cooling a resulting mixture to room temperature after a reaction, taking the resulting mixture out and washing the resulting mixture respectively with anhydrous ethanol and deionized water for three times, and subjecting the resulting mixture to a freeze drying treatment to remove water in the system to obtain a faint yellow powder B, wherein the faint yellow powder is the amidoxime modified polyacrylonitrile powder; wherein a molecular weight of the polyacrylonitrile powder in step S1 is 80,000;

S2: preparation of a casting membrane: subjecting solid materials used in step S2 to the freeze drying treatment, and adding the polyacrylonitrile powder, a chitosan powder, the faint yellow powder B, an organic macromolecular additive, and an inorganic salt additive of a predetermined mass into a second solvent to obtain a casting membrane solution C, wherein a mass fraction of the polyacrylonitrile powder in the casting membrane solution C is 8% and a molecular weight of the polyacrylonitrile powder is 80,000-150,000; a mass fraction of the chitosan powder is 4% and a molecular weight of the chitosan powder is 300,000; a mass fraction of the faint yellow powder B is 2-8% and the faint yellow powder B is obtained in step S1; a mass fraction of the organic macromolecular additive is 15%, and the organic macromolecular additive is one of polyethylene glycol, polyvinylpyrrolidone, and polyvinyl alcohol; a mass fraction of the inorganic salt additive is 0.1%, and the inorganic salt additive is one of NaCl, $MgCl_2$, $ZnCl_2$, and $CaCO_3$; and the rest of the casting membrane solution C is the second solvent, and the second solvent is one of N,N-dimethylformamide, N,N-dimethylacetamide, and N-methylpyrrolidone; and S3: preparation of the polyacrylonitrile-based uranium-extraction-from-seawater-seawater desalination cogeneration membrane: putting the casting membrane solution C in a conical flask, performing a magnetic heating and stirring to fully dissolve components of the casting membrane solution C to obtain a homogeneous casting membrane solution D, leaving the homogeneous casting membrane solution D still at a constant temperature of 25° C., performing a defoaming treatment, then casting the homogeneous casting membrane solution D to a 275±25 μm solution membrane on a glass substrate by means of manual precise membrane casting equipment, leaving the 275±25 μm solution membrane still in air for 20 min, volatilizing a part of the second solvent, immersing the 275±25 μm solution membrane into a coagulating bath at a constant temperature, taking the 275±25 μm solution membrane out after the 275±25 μm solution membrane is fully cured, and moving the 275±25 μm solution membrane to deionized water for immersion for 24 h to finally obtain the polyacrylonitrile-based uranium-extraction-from-seawater-seawater desalination cogeneration membrane E;

wherein a third solvent used in the coagulating bath in step S3 is deionized water at a temperature of 20° C., and the defoaming treatment is leaving the 275±25 µm solution membrane still for 4 h or leaving the 275±25 µm solution membrane still for 20-50 min after an ultrasonic treatment for 20-50 min.

2. The method for preparing the polyacrylonitrile-based uranium-extraction-from-seawater-seawater desalination cogeneration membrane according to claim 1, wherein in step S1, the mass ratio of the polyacrylonitrile powder to the hydroxylamine hydrochloride is 1:2.5, the volume ratio of the water to the ethanol is 9:1, the reaction temperature is 65° C., the reaction time is 6 h, and the pH value of the mixing system is 7.5.

3. The method for preparing the polyacrylonitrile-based uranium-extraction-from-seawater-seawater desalination cogeneration membrane according to claim 2, wherein in step S2, the mass fraction of the faint yellow powder B in the casting membrane solution C is 4%.

4. The method for preparing the polyacrylonitrile-based uranium-extraction-from-seawater-seawater desalination cogeneration membrane according to claim 3, wherein in step S2, in the casting membrane solution C, the second solvent is N,N-dimethylacetamide, the organic macromolecular additive is polyvinylpyrrolidone, and the inorganic salt additive is NaCl; and in step S3, a heating temperature at which the casting membrane solution C is heated and stirred is 45° C., and a stirring speed is 300 r/min; and the defoaming treatment is leaving the casting membrane solution C still for 40 min after the ultrasonic treatment for 40 min.

5. The method for preparing the polyacrylonitrile-based uranium-extraction-from-seawater-seawater desalination cogeneration membrane according to claim 1, wherein in step S1, the mass ratio of the polyacrylonitrile powder to the hydroxylamine hydrochloride is 1:1, the volume ratio of the water to the ethanol is 9:1, the reaction temperature is 50° C., the reaction time is 4 h, and the pH value of the mixing system is 7.5; and in the casting membrane solution C in step S2, the mass fraction of the faint yellow powder B is 2-8%.

6. The method for preparing the polyacrylonitrile-based uranium-extraction-from-seawater-seawater desalination cogeneration membrane according to claim 5, wherein in step S2, in the casting membrane solution C, the mass fraction of the faint yellow powder B is 8%, the mass fraction of the polyacrylonitrile powder in the casting membrane solution C is 8%, and the molecular weight of the polyacrylonitrile powder is 150,000; in the casting membrane solution C, the second solvent is N,N-dimethylacetamide, the organic macromolecular additive is polyvinylpyrrolidone, and the inorganic salt additive is NaCl; and in step S3, a heating temperature is 45° C., and a stirring speed is 300 r/min; and the defoaming treatment is leaving the casting membrane solution C still for 50 min after the ultrasonic treatment for 50 min.

7. The method for preparing the polyacrylonitrile-based uranium-extraction-from-seawater-seawater desalination cogeneration membrane according to claim 1, wherein in step S1, the mass ratio of the polyacrylonitrile powder to the hydroxylamine hydrochloride is 1:4, the volume ratio of the water to the ethanol is 9:1, the reaction temperature is 75° C., the reaction time is 8 h, and the pH value of the mixing system is 7.5; and in the casting membrane solution C in step S2, the mass fraction of the faint yellow powder B is 2-8%.

8. The method for preparing the polyacrylonitrile-based uranium-extraction-from-seawater-seawater desalination cogeneration membrane according to claim 7, wherein in step S2, in the casting membrane solution C, the mass fraction of the faint yellow powder B is 2%, the mass fraction of the polyacrylonitrile powder is 8%, and the molecular weight of the polyacrylonitrile powder is 80,000; in the casting membrane solution C, the second solvent is N,N-dimethylacetamide, the organic macromolecular additive is polyvinylpyrrolidone, and the inorganic salt additive is NaCl; and in step S3, a heating temperature at which the casting membrane solution C is heated and stirred is 45° C., and a stirring speed is 300 r/min; and the defoaming treatment is leaving the casting membrane solution C still for 30 min after the ultrasonic treatment for 30 min.

* * * * *